Patented June 15, 1954

2,681,358

UNITED STATES PATENT OFFICE 2,681,358

PROCESS FOR PREPARING DIISOTHIOCYANATES

Walter V. Wirth, Woodstown, N. J., assignor to E. I. du Pont de Nemours and Company, Wilmington, Del., a corporation of Delaware No Drawing. Application May 10, 1952, Serial No. 287,265

8 Claims. (Cl. 260—454)

This invention relates to an improved process for the preparation of organic aryl diisothiocyanates.

Recently diisocyanates have become of considerable importance commercially because of their valuable properties. The aryl diisothiocyanates undergo many of the reactions of the corresponding diisocyanates and, in addition, have the advantage that they are more stable and may be used with fewer precautions. For example, 2,4-tolylene diisocyanate is a liquid which reacts instantaneously with water and has a high vapor pressure which requires special safety precautions because of its poisonous vapors. On the other hand, 2,4-tolylene diisothiocyanate is a solid which is relatively inert toward water and, in addition, has a low vapor pressure and, consequently, can be used more safely. It will be apparent, therefore, that a method which produces high yields of the organic aryl diisothiocyanates would be highly desirable.

Unfortunately, the methods disclosed in the prior art for preparing these compounds present difficulties which restrict their use commercially. According to Berichte 8, 669 (1875), Lussey reacted phenyl isothiocyanate with 2,4-tolylene diisocyanate to get bis-phenyl thiourea. This was then decomposed in boiling hydrochloric acid from which 2,4-tolylene diisothiocyanate was recovered in a low yield with a melting point of 56° C.

Billenter and Steiner, Berichte 20, 280 (1885), treated an aqueous suspension of m-phenylene diamine with thiophosgene in chloroform and obtained m-phenylene diisothiocyanate having a melting point of 53° C. Whitmore (Organic Chemistry, Second Edition) p. 453, discloses that isothiocyanates generally can be prepared by reacting a primary amine with carbon bisulfide in the presence of lead nitrate or similar salt that gives insoluble sulfide. British Patent 495,510, discloses a somewhat similar method.

None of these methods, however, are satisfactory in that they give poor yields and require unusual or expensive reagents. The processes of carrying out the reactions and the purification of the isothiocyanates are troublesome and time-consuming, and most of them represent laboratory experiments of academic interest only which are not amenable to utilization on a commercial scale.

It is an object of the present invention, therefore, to provide a simple, economical process for preparing organic aryl diisothiocyanates. Another object is the provision of a method by which such diisothiocyanates may be prepared on a commercial scale with readily available solvents. A still further object is the provision of a method by which these compounds may be made which require a minimum of control and preparation. Other objects will appear as the description of the invention proceeds.

These objects are accomplished by reacting a limited molar excess of aryl diisocyanate with phosphorus pentasulfide in a solvent which is inert to the reactants and the product, and which results in the formation of $P_4O_6S_4$ as a by-product. The method is carried out in a simple manner by dissolving the aryl diisocyanate in a solvent, adding phosphorus pentasulfide and heating at the reflux temperature of the solvent for about 3 hours. The reaction usually proceeds very smoothly and when finished, the aryl diisothiocyanate can be recovered by cooling the reaction mass to below 100° C. and washing the reaction mass several times with water until the wash water is essentially acid-free. The solvent is then distilled off leaving the aryl diisothiocyanate having a purity of about 95% to 97% and a yield up to 90% or better in the preferred embodiment.

It has also been found that to obtain the best yields, certain limitations must be observed. Among these is the ratio of aryl diisocyanate to the phosphorus pentasulfide. As indicated above, there should be a definite excess of the diisocyanate, and a molar ratio of from 1.25 to 1.5 to each mol of aryl diisocyanate to each mol of phosphorus pentasulfide is preferred. When the $P_2S_5$ is lower than this range, a decrease in yield occurs and the reaction mass is more difficult to work. On the other hand, when the $P_2S_5$ ratio is considerably larger than indicated in the range, considerable difficulty in isolating the diisothiocyanate is experienced together with a waste of $P_2S_5$ without any compensating advantage.

The ratio of solvent present, based on the aryl diisocyanate, is not particularly critical, but from 2 to 4 times as much solvent as diisocyanate is the preferred range. Smaller amounts of solvent produce a reaction mass which is too viscous to handle easily and presents considerable difficulty in washing out the undesirable by-products. A higher ratio of solvent dilutes the reaction mass unnecessarily and decreases the amount of product that can be produced in a given size of reaction vessel.

There is no restriction placed on the type of solvent provided it is inert to the reactants and the reaction product. The solvents should not have active hydrogen atoms which would react with the —NCO or —NCS groups under the conditions of preparation. Suitable solvents are the hydrocarbons, halogenated hydrocarbons, and ethers having a satisfactory boiling point which preferably lies within the range of about 140° C. to 200° C. The aromatic type solvents, particularly the chlorinated aromatic hydrocarbons, are preferred since they usually have better solubility for the reactants.

Reaction temperatures below 140° C. usually require excessively long reaction times, while temperatures much above 200° C. may result in some decomposition. Consequently, reaction temperatures within this range are preferred.

It has also been found that when the above limitations are observed, there seems to be a correlation between high yields and the formation of $P_4O_6S_4$, possibly due in part to its solubility in water and in the solvents used. Based on experimental research, the following equation appears to represent the reaction which takes place:

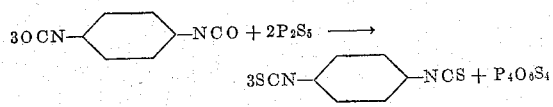

The following examples are given by way of illustration, and no restriction is placed on the ingredients except as will be apparent from the appended claims.

*Example I*

69.6 parts of 2,4-tolylene diisocyanate is dissolved in 200 parts of o-dichlorobenzene, and 60 parts of phosphorus pentasulfide is added (molar ratio of diisocyanate to phosphorus pentasulfide 1.48:1.0). The mixture is heated at 190° to 193° C. for 3 hours. After standing overnight, a small amount of granular insoluble residue is filtered off. The mass is then washed twice by stirring with about 400 parts of water and separating the aqueous layer from the solvent layer. The solvent is removed by distillation at approximately 20 mm. pressure. A yield of 75 g. of a brownish yellow solid is obtained. The product is purified by fractional distillation under reduced pressure. A main fraction of 57.4 parts is obtained boiling at 168° C. at 6 mm. pressure and a second fraction of 15.8 g. boiling at 151° C. at 4 mm. is also collected. The main fraction of 2,4-tolylene diisothiocyanate has a freezing point of 54.4° C. and a boiling point of 162° C. at 3 mm., forms a mass of white needle crystals on solidifying and shows the following analysis:

|  | Found | Calculated |
| --- | --- | --- |
| Nitrogen | 13.6 | 13.58 |
| Sulfur | 31.2 | 31.09 |

The second fraction has a freezing point of 52° C. The yield is 89% of theory.

Instead of o-dichlorobenzene, trichlorobenzene has been used with similar results.

When this run is repeated but using only 50 parts of $P_2S_5$ (molar ratio of diisocyanate to $P_2S_5=1.78:1.0$) the yield of diisothiocyanate drops to 52 parts or a yield of 62% and 12 parts of a product containing one isocyanate and one isothiocyanate group is obtained.

*Example II*

69.6 parts of 2,4-tolylene diisocyanate is dissolved in 200 parts of o-dichlorobenzene and 70 parts of phosphorus pentasulfide is added (mol ratio of diisocyanate: $P_2S_5=1.27:1.0$). The mixture is then heated to 188° to 193° C. for 3 hours. The mass is cooled, a small amount of insoluble matter is filtered off, and it is washed twice with about 300 parts of water at 70° to 80° C., and once with about 300 parts of water at 20° to 30° C. The first wash water is strongly acid, but the third is only weakly acid.

The solvent is distilled off and the product is fractionated, a yield of 69.1 parts of 2,4-tolylene diisothiocyanate being obtained, which represents a yield of about 84%.

*Example III*

64.1 Parts of m-phenylene diisocyanate is dissolved in 200 parts of o-dichlorobenzene and 60 parts of phosphorus pentasulfide (molar ratio diisocyanate to $B_2S_5=1.48:1.0$) is added and the mixture is heated for 3 hours at 186° to 192° C. The mass is then cooled. A small amount of insoluble residue is filtered off and the filtrate is washed 3 times each with 300 parts of water at 70° to 80° C. The third wash is only slightly acidic. The solvent is distilled off and the crude m-phenylene diisothiocyanate is purified by fractional distillation. A yield of 83% is obtained. The main fractions of 57 parts have freezing points of 51° to 52° C. The middle fraction, which is purest, has a melting point of 54.8° to 55.2° C.

While the invention has been illustrated by the use of 2,4-tolylene diisocyanate and m-phenylene diisocyanates, other aryl diisocyanates may be used in equivalent amount with the same or different solvents as suggested above. The following aryl diisocyanates are typical of others which may be used, but no restriction is placed thereon, since other diisocyanates having similar substituents may replace these in the examples in equivalent amounts:

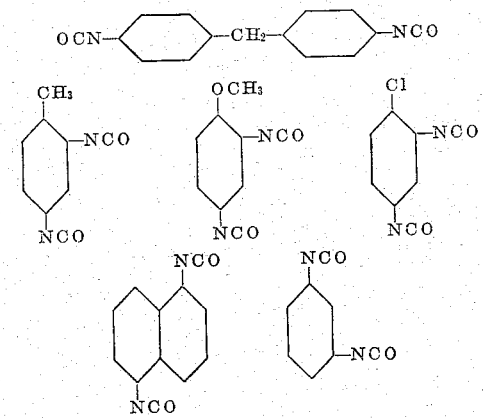

While $P_2S_5$ has been used for the preparation of phenyl isothiocyanate, there has been no disclosure of its use in the preparation of diisothiocyanates. Equal weights of the reactants gave poor results in yield and in handling, and it was only after the discovery of controlling the reaction so that $P_4O_6S_4$ was formed that good yields and easy recovery of the product were obtained.

It will be apparent that many widely different embodiments of this invention may be made without departing from the spirit and scope thereof, and therefore, it is not intended to be limited except as indicated in the appended claims.

I claim:

1. The process of preparing organic aryl diisothiocyanates which comprises reacting 1.25 to 1.5 mols of an aryl diisocyanate with 1.0 mol of phosphorus pentasulfide in a solvent which is inert to the reactants and reaction product.

2. The process of preparing organic aryl diisothiocyanates which comprises refluxing in proportion from 1.25 to 1.5 mols of an aryl diisocyanate with 1 mol of phosphorus pentasulfide in an inert solvent boiling between about 140° and 200° C., which is present in amount between 2 and 4 times the weight of aryl diisocyanate, cooling the reaction mass below 100° C. and separating the resulting aryl diisothiocyanate from the reaction mass.

3. The process of claim 2 in which the solvent is a chlorinated aromatic hydrocarbon.

4. The process of claim 2 in which the solvent is an aromatic hydrocarbon.

5. The process of claim 2 in which the aryl diisocyanate is 2,4-tolylene diisocyanate.

6. The process of claim 2 in which the diisocyanate is m-phenylene diisocyanate.

7. The process of claim 2 in which one of the reaction products is $P_4O_6S_4$.

8. The process which comprises reacting about 69.6 parts of 2,4-tolylene diisocyanate dissolved in about 200 parts of o-dichlorobenzene and 60 parts of phosphorus pentasulfide, refluxing the mixture at about 190° to 193° C. for about 3 hours, allowing the reaction mass to stand, washing the resulting reaction mass with water, separating the aqueous layer from the solvent layer, removing the solvent by distillation at reduced pressure, and subjecting the resulting product consisting essentially of 2,4-tolylene diisothiocyanate to fractional distillation.

References Cited in the file of this patent

Slotta et al., Ber. Deut. Chem. Gesell., vol. 63 (1930), page 888.